(12) United States Patent
Kawahara et al.

(10) Patent No.: US 6,401,551 B1
(45) Date of Patent: Jun. 11, 2002

(54) FINGERPRINT READING DEVICE

(75) Inventors: Yukito Kawahara; Hiroyuki Fujita; Tsutomu Matsuhira, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/634,660

(22) Filed: Aug. 7, 2000

(30) Foreign Application Priority Data

Aug. 9, 1999 (JP) ............................................ 11-225766

(51) Int. Cl.$^7$ ................................................. G01L 3/02
(52) U.S. Cl. ................................................. 73/862.337
(58) Field of Search .................. 73/780, 777, 862.041, 73/862.046, 862.337, 818, 820; 382/124

(56) References Cited

U.S. PATENT DOCUMENTS

| | | | | |
|---|---|---|---|---|
| 4,221,975 A | * | 9/1980 | Ledniczki et al. .......... 307/116 |
| 5,122,787 A | * | 6/1992 | Fujita et al. ................ 340/712 |
| 5,325,442 A | * | 6/1994 | Knapp ............................ 382/4 |
| 5,598,474 A | * | 1/1997 | Johnson ........................ 380/23 |
| 5,785,666 A | * | 7/1998 | Costello et al. ............. 600/595 |
| 5,844,287 A | * | 12/1998 | Hassan et al. ............... 257/419 |

* cited by examiner

*Primary Examiner*—Max Noori
(74) *Attorney, Agent, or Firm*—Adams & Wilks

(57) ABSTRACT

A fingerprint reading device is provided, which is capable of enhancing a versatility when actually used, increasing a productivity and reducing costs. The fingerprint reading device comprises an electrostatic capacity type fingerprint reading sensor provided on a liquid crystal panel, and drive circuits thereof. The fingerprint reading sensor includes detection electrodes arranged in predetermined positions, active elements connected respectively to the detection electrodes, and a protective film provided on the surface thereof.

18 Claims, 4 Drawing Sheets

FINGERPRINT READING DEVICE

BACKGROUND OF THE INVENTION

1. Field of the Invention

The present invention relates generally to a fingerprint reading device, and more particularly to an electrostatic capacity type fingerprint reading device.

2. Related Background Art

Some of systems for authenticating an individual for the purpose of keeping confidentiality, etc. have hitherto used an ID number, a password and so on, however, it was not perfect to maintain the confidentiality because the ID number and the password might leak out. While on the other hand, a system using a fingerprint reading device is proposed as that capable of keeping the confidentiality at a much higher level.

There were hitherto proposed electrostatic capacity type fingerprint reading devices (Japanese Patent Application Laid-Open Publication No.Hei4-231803, etc.) for detecting a fingerprint pattern by utilizing the fact that electrostatic capacities occurred between a group of electrodes arranged in a two-dimensional array and a finger touching on the electrode group through a dielectric substance layer differ corresponding to a ruggedness of the fingerprint. Some of this type of fingerprint reading devices have been utilized.

There was not, however, a well-designed application about what sort of apparatus incorporates such type of fingerprint reading device and how the fingerprint reading device is used, and very few fingerprint reading devices have been utilized.

SUMMARY OF THE INVENTION

It is a primary object of the present invention, which was devised under such circumstances, to provide a finger print reading device capable of enhancing a versatility when actually used, increasing productivity and reducing costs.

To accomplish the above object, according to a first aspect of the present invention, a fingerprint reading device comprises an electrostatic capacity type fingerprint reading sensor provided on a liquid crystal panel, and a drive circuit thereof. The fingerprint reading sensor includes detection electrodes arranged in predetermined positions, active elements connected respectively to the detection electrodes, and a protective film provided on the surface thereof.

According to the first aspect of the invention, the fingerprint reading sensor is provided in the vicinity of the liquid crystal panel, whereby the fingerprint reading device is easy to apply to an electronic apparatus, etc. mounted with the liquid crystal panel.

According to a second aspect of the present invention, the fingerprint reading device according to the first aspect of the invention is characterized in that the detection electrodes and the active elements may be arranged in a two-dimensional array.

According to the second aspect of the invention, an image of the fingerprint can be read by the detection electrodes arranged in the two-dimensional array.

According to a third aspect of the present invention, the fingerprint reading device according to the first or second aspect of the invention is characterized in that the liquid crystal panel may have a pair of transparent substrates, one of the transparent substrates may have a protruded portion protruding outside from a display area, and the fingerprint reading sensor may be provided on the protruded portion.

According to the third aspect of the invention, the fingerprint reading sensor can be incorporated integrally with the liquid crystal panel into the electronic apparatus, etc., which saves the installation space.

According to a fourth aspect of the present invention, the fingerprint reading device according to the third aspect of the invention is characterized in that the fingerprint reading sensor may be formed together with the transparent electrodes and the active elements of the liquid crystal panel on one of the transparent substrates by the same process.

According to the fourth aspect of the invention, the fingerprint reading sensor is formed simultaneously in a thin-film process of forming the transparent electrodes and the thin-film active elements of the liquid crystal panel, whereby the manufacturing costs can be decreased to a considerable degree.

According to a fifth aspect of the present invention, in the fingerprint reading device according to the third or fourth aspect, the active element of the fingerprint reading sensor may be a thin-film transistor.

According to the fifth aspect of the invention, the thin-film transistor of the fingerprint reading sensor can be formed by the same process as in the thin-film transistor of the liquid crystal panel.

According to a sixth aspect of the present invention, in the fingerprint reading device according to the first or second aspect, the detection electrode of the fingerprint reading sensor may be a transparent electrode, and the fingerprint reading sensor may be provided in at least a part of the display area of the liquid crystal panel.

According to the sixth aspect of the invention, the fingerprint reading sensor is provided in superposition on the display area of the liquid crystal panel, and it is therefore feasible to incorporate the fingerprint reading sensor together with the liquid crystal panel into the electronic apparatus, etc. and save the installation space of the fingerprint reading sensor.

According to a seventh aspect of the present invention, the fingerprint reading sensor according to the sixth aspect may be provided on the surface of the transparent substrate or a polarizing plate of the liquid crystal panel.

According to the seventh aspect of the invention, the fingerprint reading sensor is provided on the transparent substrate or the polarizing plate and is thereby made integral with the liquid crystal panel.

According to an eighth aspect of the present invention, in the fingerprint reading device according to the sixth or seventh aspect of the invention, the active element of the fingerprint reading sensor may be a thin-film transistor.

According to the eighth aspect of the invention, the fingerprint reading sensor constructed of the transparent electrodes and the thin-film transistors can be easily manufactured by the same manufacturing process as in the liquid crystal panel.

DESCRIPTION OF THE PREFERRED EMBODIMENTS

Embodiments of the present invention will hereinafter be described.

Figure 1:
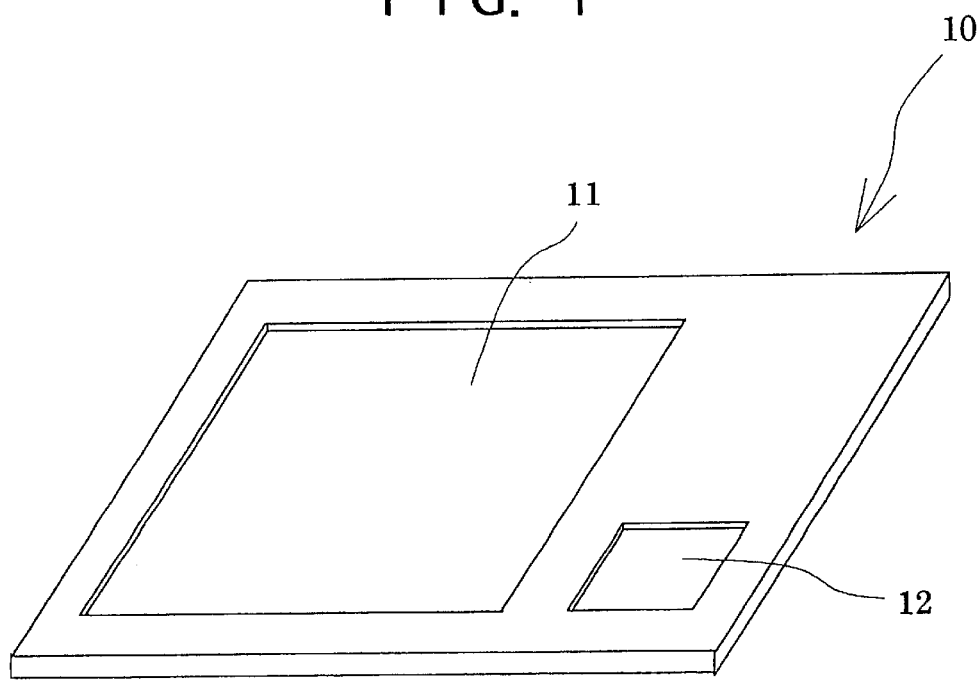
FIG. 1 is a view showing an external configuration of a liquid crystal display device mounted with a fingerprint reading device in one embodiment of the present invention.

FIG. 1 schematically shows a configuration of a liquid crystal display device mounted with a fingerprint reading device in one embodiment.

As illustrated in FIG. 1, a liquid crystal display device 10 includes a fingerprint reading sensor 12 in close proximity to a liquid crystal display unit 11, and incorporates, though not illustrated, a drive circuit for driving each of these components.

Figure 2:
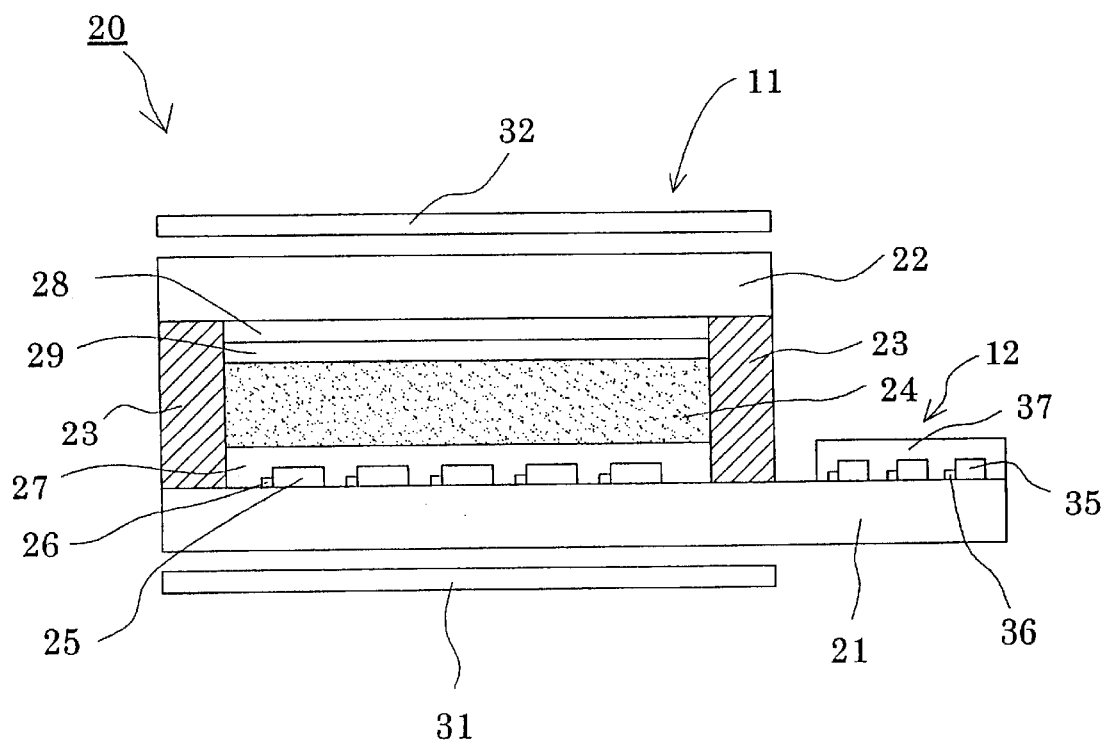
FIG. 2 is a sectional view showing the liquid crystal display device mounted with the fingerprint reading device in one embodiment of the present invention.

Herein, an outline of a configuration of a liquid crystal panel constituting the liquid crystal display unit 11 and the fingerprint reading sensor 12 will be explained referring to FIG. 2 schematically showing the section thereof.

As shown in FIGS. 1 and 2, the liquid crystal display unit 11 of a liquid crystal panel unit 20 is constructed in a way of joining a first transparent substrate 21 to a second transparent substrate 22 through a spacer 23, and interposing a liquid crystal layer 24 therebetween. Further, transparent electrodes 25 and active elements 26 are arranged on the first transparent substrate 21 in a two-dimensional array corresponding to pixels in a face-to-face relation with the liquid crystal layer 24, and an orientated film 27 is provided covering these electrodes 25 and elements 26. On the other hand, under the second transparent substrate 22, a common transparent electrode 28 and an oriented film 29 are provided above the liquid crystal layer 24. Note that polarizing plates 31, 32 are provided on the outside of the first and second transparent substrates 21, 22.

Herein, the first transparent substrate 21 has a protruded portion at its one side end, which protrudes from the second transparent substrate 22. The protruded portion is provided with a fingerprint reading sensor 12 together with wirings of the liquid crystal display unit 11.

The fingerprint reading sensor 12 includes detection electrodes 35 and active elements 36 that are arranged in a two-dimensional array and covered with a protective film 37 defined as a dielectric film.

Figure 3A:
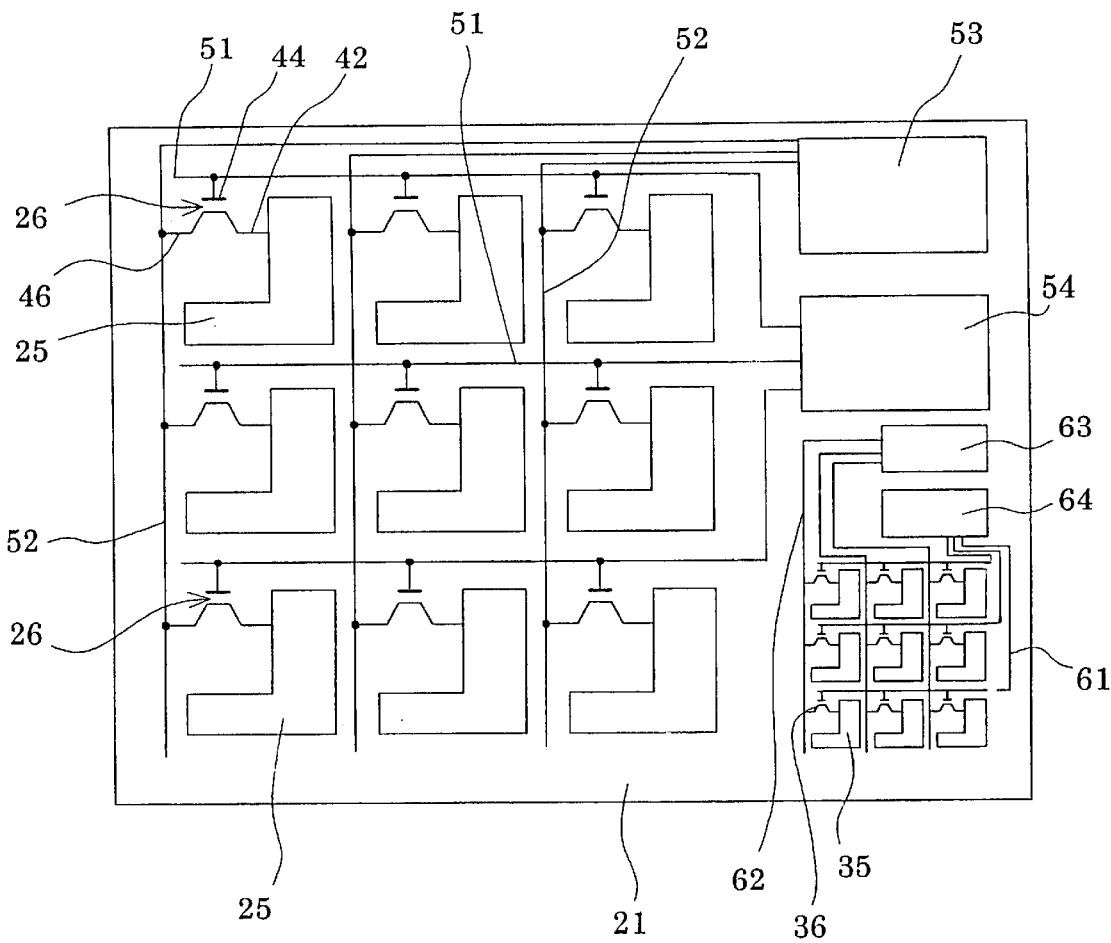
FIG. 3(a) is a plan view schematically showing principal components of the liquid crystal display device mounted with the fingerprint reading device in one embodiment of the present invention.
Figure 3B:
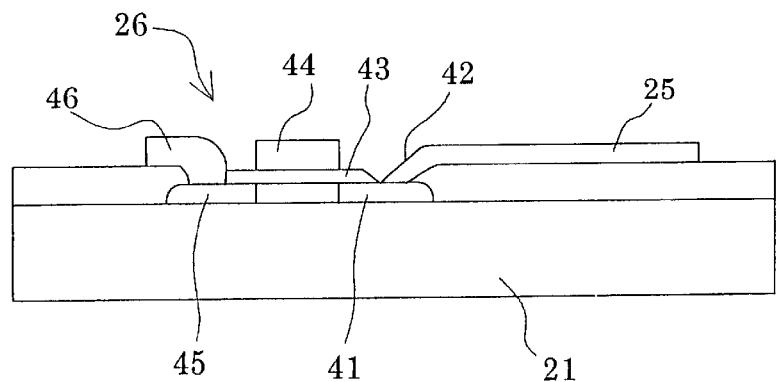
FIG. 3(b) is a sectional view thereof.

FIG. 3(a) is a plan view schematically showing the first transparent substrate 21. The transparent electrodes 25 and the active elements 26 of the liquid crystal display unit 11, and the detection electrodes 35 and the active elements 36 of the fingerprint reading sensor 12, are arranged in a geometry illustrated in, e.g., FIG. 3(a). FIG. 3(b) shows a structure on a display or detection basis. Note that the electrodes and the active elements of the liquid crystal display unit 11 and of the fingerprint reading sensor 12, are arranged in the two-dimensional array, which is, as a matter of course, different from the actual configuration.

Further, the embodiment discussed above has given the example where the protruded portion of the transparent substrate 21 is provided with the drive circuit inclusive. A structure may also be of course taken, wherein the protruded portion of the substrate is provided with only a terminal of the wiring, and the drive circuit is connected via a flexible cable, etc.

Herein, each of the active elements 26 and 36 is constructed of a thin-film transistor (TFT) such as an electric field effect type insulating gate transistor. The discussion will hereinafter be made by exemplifying the liquid crystal display unit 11. As will be mentioned later on, however, the fingerprint reading sensor 12 takes basically the same structure.

A source electrode 42 connected to a source region 41 of the transistor serving as the active element 26, is connected to the transparent electrode 25. A gate electrode 44 provided on a gate oxide layer 43 is connected to a scan line 51. A drain electrode 46 connected to a drain region 45 is connected to a signal line 52. A plurality of signal lines 52 are arranged so that the drain electrodes 46 of the respective transistors are connected in series in the Y-axis direction. The signal lines 52 are connected to an X-axis driver 53. Further, a plurality of scan lines 51 are arranged so that the gate electrodes 44 of the respective transistors are connected in series in the X-axis direction. The scan lines 51 are connected to the Y-axis driver 54.

Further, the source electrode of the active element 36 is connected to the transparent electrode 35, and the gate electrode is connected in series to a scan line 61. Further, the drain electrode is connected in series to a signal line 62, and the signal line is connected to the X-axis driver 63. The scan line 61 is connected to the Y-axis driver 64.

The transparent electrodes 25 and the active elements 26 of the thus constructed liquid crystal display unit 11 and the detection electrodes 35 and the active elements 36 of the fingerprint reading sensor 12, can be simultaneously manufactured by a typical thin-film manufacturing process that is conventionally known. To be specific, the liquid crystal display unit 11 and the fingerprint reading sensor 12 may take substantially the same structure except that sizes and an array pitch of each of the elements are different, and the manufacturing process of the fingerprint reading sensor 12 can be executed simultaneously with manufacturing the display unit of the liquid crystal panel. Manufacturing costs thereof can be reduced to a considerable degree. Note that the detection electrode 35 is composed of the same material as the transparent electrode 25 in the case of being manufactured by the same process, however, the detection electrode 35 itself is not necessarily the transparent electrode and may be composed of a different material.

A resolution of the liquid crystal display unit 11 is determined depending on an application of use and is not particularly limited, however, a resolution of the fingerprint display sensor 12 is on the order of 300 dpi as a standard value at a pitch of approximately 50 $\mu$m. Moreover, the active elements 25, 35 are not confined to the thin-film transistors described above but may be thin-film diodes.

Next, steps in which the fingerprint reading sensor 12 reads the fingerprint will briefly be explained.

Figure 4A:
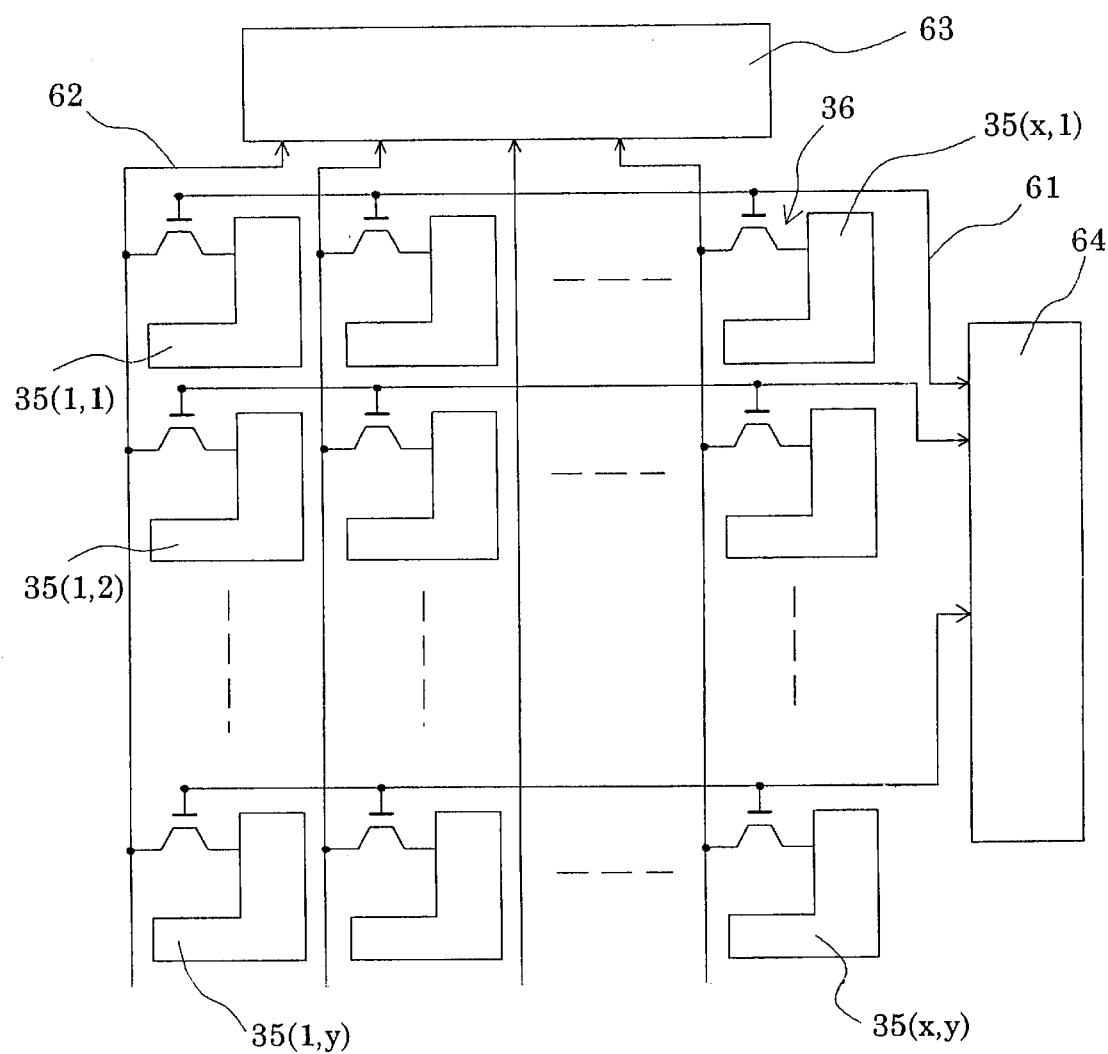
FIGS. 4(a) and 4(b) are views showing how detection electrodes of the fingerprint reading sensor of the fingerprint reading device in one embodiment of the present invention, are arrayed and how a fingerprint is read.
Figure 4B:
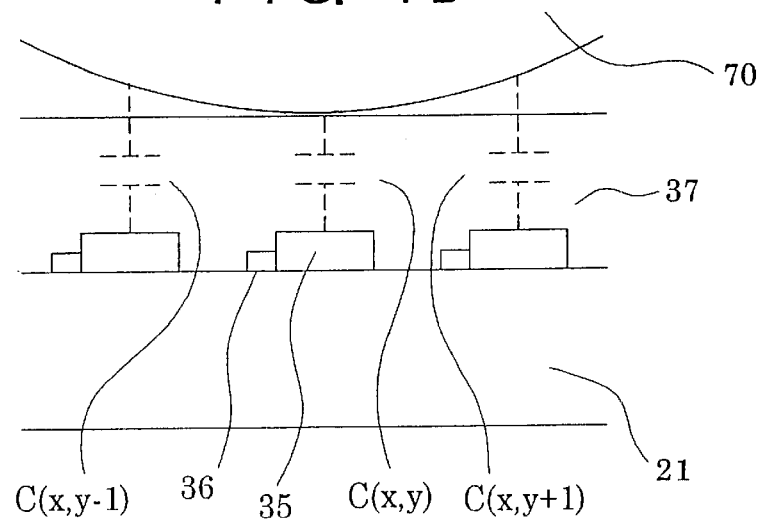

FIG. 4(a) shows an array of the detection electrodes 35 of the fingerprint reading sensor 12. FIG. 4(b) schematically shows a state of reading the fingerprint.

As shown in FIG. 4(a), the detection electrodes 35 are in a state of active addressing via the active elements 36. The detection electrodes 35 are connected to x-pieces of signal lines 62 connected to an X-axis driver 63 and to y-pieces of scan lines 61 connected to a Y-axis driver 64, and have addresses (1, )–(x, y).

When detecting the fingerprint, to start with, the X-axis driver 63a selects a predetermined signal line 62 and applies a predetermined voltage to a gate electrode, in which state a voltage of approximately, e.g., 10V is applied to all the active elements 36 through all the scan lines 61. The voltage is thereby applied to the detection electrode 35 connected to the active element 36 selected after the predetermined voltage has been applied to the gate electrode. FIG. 4(b) shows a state in this case. At this moment, a capacitor C[(x, y−1), (x, y), (x, y+1)] indicated by a broken line is formed between a finger 70 and the detection electrode 35. A capacitor of each of these capacitors C depends on a distance between the detection electrode and the finger. A larger capacitance occurs with a larger projected area of the fingerprint, and by contrast a smaller capacitance occurs with a deeper recessed area thereof.

The capacitance described above can be detected by the X-axis driver 63 via each line 62. Then, this operation is carried out for each scan line 61, whereby the capacitance generated between each detection electrode 35 and the finger can be detected. An image of the fingerprint can be thereby formed.

In accordance with the embodiment discussed above, the fingerprint reading device may be provided in a way of being attached to the liquid crystal panel. Besides, the fingerprint reading sensor can be manufactured by the thin-film manufacturing process of the liquid crystal panel, and hence it is possible to save space when incorporating the device into a variety of electronic apparatuses and also reduce the costs.

Further, the fingerprint reading device described above may easily be incorporated into a variety of electronic apparatuses each having the liquid crystal display device, such as various personal computers, mobile terminals, mobile telephones, personal handyphone systems (PHS) and display-attached cards. On this occasion, according to the configuration described above, the surface of the fingerprint reading sensor 12 is more recessed than the surface of the liquid crystal panel, which, however, yields an advantage that a peripheral edge of the recessed portion serves as a guide for placing the finger and a finger alignment can be easily attained.

Thus, in terms of enhancing handleability when incorporating the fingerprint reading device integral with the liquid crystal panel into the electronic apparatus and saving the installation space, the fingerprint detection sensor may be provided in superposition on the display area of the liquid crystal panel.

Figure 5A:
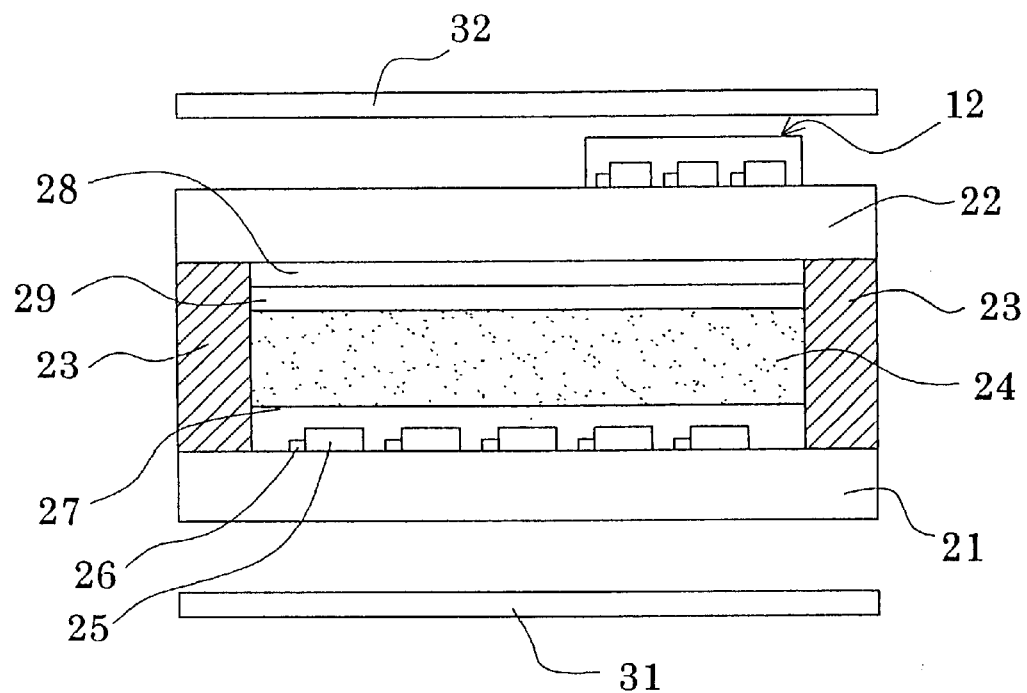
FIGS. 5(a) and 5(b) are sectional views schematically showing a liquid crystal panel mounted with the fingerprint reading device in another embodiment of the present invention.
Figure 5B:
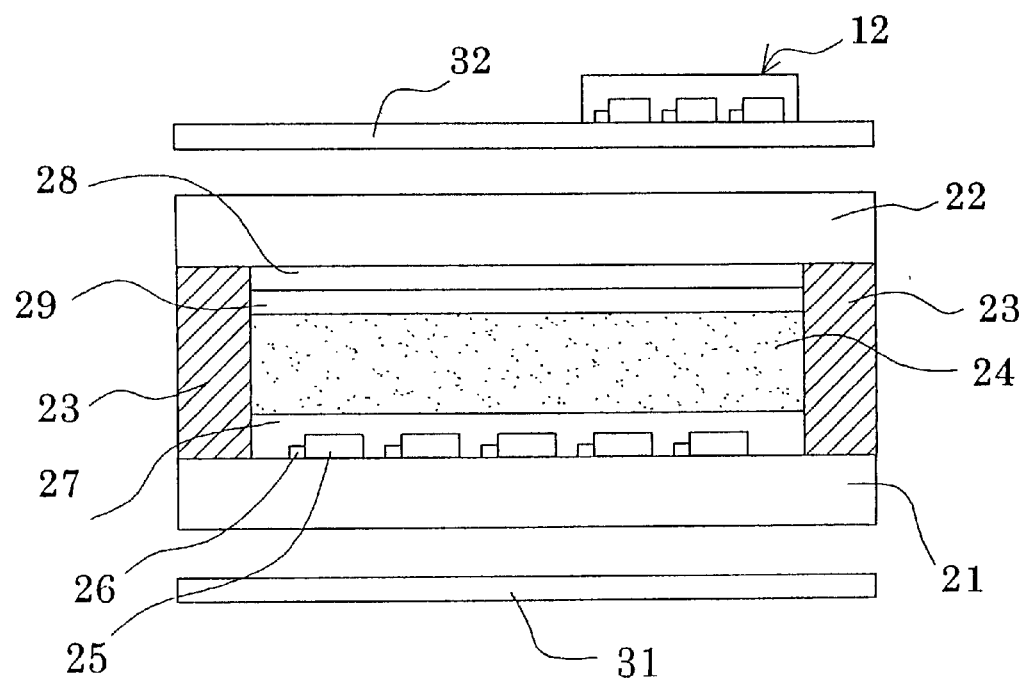

This example is illustrated in FIGS. 5(a) and 5(b). FIG. 5(a) shows an example where the fingerprint detection sensor 12 is provided on the outside of the second transparent substrate 22. FIG. 5(b) shows an example here the fingerprint detection sensor 12 is provided on the polarizing plate 32. Note that the members performing the same functions as those in embodiment discussed above are marked with the like numerals, of which the repetitive explanations are omitted.

The fingerprint reading sensor is manufactured separately from the thin-film manufacturing process of the liquid crystal panel but may also be manufactured by the same thin-film manufacturing process. In this case, it is required that the detection electrodes of the fingerprint detection sensor 12 be, as a matter of course, the transparent electrodes.

Further, the thus constructed fingerprint reading sensor 12 may be disposed, without being limited to a specific position in the plane-direction of the liquid crystal display area, at a corner or central portion of the display area, and further the whole display area may also be utilized as the fingerprint reading sensor.

Moreover, each embodiment discussed above has exemplified the geometry that each detection electrodes of the fingerprint reading sensor are arranged in the two-dimensional array but is not limited to this layout. The detection electrodes may also be arranged one-dimensionally, and the fingerprint can be likewise detected by a method of scanning while making the finger slide on these detection electrodes. Note that the construction of the fingerprint reading sensor is the same as what has been described above except for the one-dimensional layout, and hence the detailed explanation thereof is omitted herein.

The fingerprint reading sensor with the one-dimensionally arranged electrodes is, when used, advantageous in terms of saving the installation space on the occasion of being mounted on a small-sized mobile terminal.

As discussed above, according to the present invention, the electrostatic capacity type fingerprint reading sensor and the drive circuit thereof are provided on the liquid crystal panel, thereby exhibiting effects of being capable of enhancing the versatility when actually used, increasing the productivity and reducing the costs.

What is claimed is:

1. A fingerprint reading device comprising: a liquid crystal panel having a pair of transparent substrates; and an electrostatic capacity type fingerprint reading sensor provided on the liquid crystal panel and having detection electrodes arranged in a two dimensional array, active elements connected respectively to the detection electrodes, a protective film provided over the active elements and the detection electrodes, and a drive circuit, the detection electrodes, active elements, protective film and drive circuit of the fingerprint reading sensor being formed directly on the liquid crystal panel.

2. A fingerprint reading device according to claim 1; wherein the fingerprint reading sensor is provided in at least a part of a display area of the liquid crystal panel.

3. A fingerprint reading device according to claim 1; wherein one of the transparent substrates has a protruded portion protruding outside a display area of the liquid crystal panel, and the fingerprint reading sensor is formed on the protruded portion.

4. A fingerprint reading device according to claim 3; wherein the detection electrodes and the active elements of the fingerprint reading sensor are formed together with transparent electrodes and active elements of the liquid crystal panel on one of the transparent substrates in a single process.

5. A fingerprint reading device according to one of claims 3 or 4; wherein the active elements of the fingerprint reading sensor comprise thin-film transistors.

6. A fingerprint reading device according to claim 1; wherein the detection electrodes of the fingerprint reading sensor comprise transparent electrodes.

7. A fingerprint reading device according to claim 6; wherein the fingerprint reading sensor is formed on a surface of one of the transparent substrates or a polarizing plate of the liquid crystal panel.

8. A fingerprint reading device according to one of claims 6 or 7; wherein the active elements of the fingerprint reading sensor comprise thin-film transistors.

9. A fingerprint reading device comprising: a liquid crystal panel having a pair of opposed substrates at least one of which is transparent, a liquid crystal material disposed between the substrates, and driving elements formed on one of the substrates; and a capacitive type fingerprint sensor having detection electrodes and active elements formed on a transparent substrate of the liquid crystal panel and arranged in an array, and a drive circuit for driving the active elements and the electrodes formed on the transparent substrate.

10. A fingerprint reading device according to claim 9; wherein the liquid crystal panel has transparent electrodes and active elements for driving the transparent electrodes formed on one of the transparent substrates.

11. A fingerprint reading device according to claim 9; wherein the detection electrodes and the active elements of the fingerprint sensor and transparent electrodes and switching elements of the liquid crystal panel are formed on the transparent substrate in a single process.

12. A fingerprint reading device according to claim 9; wherein the fingerprint sensor is provided in superposition on at least a part of a display area of the liquid crystal panel.

13. A fingerprint reading device according to claim 9; wherein the liquid crystal panel has a matrix of transparent electrodes driven by thin film switching elements, the transparent electrodes and thin film switching elements being arranged in an array similar to that of the detection electrodes and active elements of the fingerprint sensor.

14. A fingerprint reading device according to claim 13; wherein the thin film switching elements of the liquid crystal panel and the active elements of the fingerprint sensor comprise thin film transistors.

15. A fingerprint reading device according to claim 9; wherein the liquid crystal cell has a resolution of about 300 dpi and a pitch between adjacent pixels of about 50 $\mu$m.

16. A fingerprint reading device according to claim 9; wherein the liquid crystal panel has a plurality of pixel elements arranged in a matrix between the opposed substrates for altering the light transmission characteristics of the liquid crystal material.

17. A fingerprint reading device according to claim 16; wherein the pixel elements comprise a transparent electrode and an active switching element formed on one of the transparent substrates facing the liquid crystal material.

18. A fingerprint reading device according to claim 16; wherein one of the opposed substrates is larger than the other and has a portion protruding therefrom, and the fingerprint sensor is formed on the protruding portion of the one substrate.

* * * * *